(12) United States Patent
Jacobson

(10) Patent No.: US 7,116,479 B1
(45) Date of Patent: Oct. 3, 2006

(54) ARRAY POLARIZATION BEAMSPLITTER AND COMBINER

(75) Inventor: Alexander Jacobson, Fremont, CA (US)

(73) Assignee: Wavesplitter Technologies, Inc., Santa Clara, CA (US)

( * ) Notice: Subject to any disclaimer, the term of this patent is extended or adjusted under 35 U.S.C. 154(b) by 8 days.

(21) Appl. No.: 09/909,661

(22) Filed: Jul. 19, 2001

(51) Int. Cl.
G02B 27/28 (2006.01)
G02B 5/30 (2006.01)

(52) U.S. Cl. .................. 359/487; 359/496; 359/638; 359/640; 385/11

(58) Field of Classification Search ............... 359/109, 359/115, 131, 129, 485, 320, 487, 495, 496, 359/629, 638–640; 385/34, 31, 36, 47, 50, 385/51, 11
See application file for complete search history.

(56) References Cited

U.S. PATENT DOCUMENTS

| | | | |
|---|---|---|---|
| 4,176,908 A | 12/1979 | Wagner | |
| 4,431,258 A | 2/1984 | Fye | |
| 4,478,494 A * | 10/1984 | Soref | ............ 359/320 |
| 4,566,761 A | 1/1986 | Carlsen et al. | |
| 4,701,010 A | 10/1987 | Roberts | |
| 4,701,012 A * | 10/1987 | Kaiser | ............ 398/79 |
| 4,720,162 A | 1/1988 | Mochizuki et al. | |
| 5,245,472 A * | 9/1993 | Hegg | ............ 359/496 |
| 5,291,571 A | 3/1994 | Kunikane et al. | |
| 5,583,683 A | 12/1996 | Scobey | |
| 5,621,832 A * | 4/1997 | Yokoyama et al. | ............ 385/48 |
| 5,771,122 A | 6/1998 | Shuman | |
| 5,841,797 A | 11/1998 | Ventrudo et al. | |
| 5,936,763 A | 8/1999 | Mitsuda et al. | |
| 6,031,952 A * | 2/2000 | Lee | ............ 358/47 |
| 6,040,942 A | 3/2000 | Bergmann | |
| 6,052,394 A | 4/2000 | Lee et al. | |
| 6,160,665 A * | 12/2000 | Yuan | ............ 359/629 |
| 6,292,288 B1 | 9/2001 | Akasaka et al. | |
| 6,301,030 B1 | 10/2001 | Robinson | |
| 6,342,961 B1 | 1/2002 | Bergano et al. | |
| 6,344,922 B1 | 2/2002 | Grubb et al. | |
| 6,363,186 B1 * | 3/2002 | Popelek et al. | ............ 385/36 |
| 6,373,631 B1 | 4/2002 | Huang et al. | |
| 6,414,786 B1 | 7/2002 | Foursa | |
| 6,422,309 B1 | 7/2002 | Vincent | |
| 6,442,309 B1 | 8/2002 | Michishita | |
| 2002/0101634 A1 | 8/2002 | Ye | |
| 2003/0025842 A1 * | 2/2003 | Saccomanno | ............ 348/758 |

FOREIGN PATENT DOCUMENTS

| | | |
|---|---|---|
| EP | 0268523 | 5/1988 |
| JP | 61-170721 | 8/1986 |

(Continued)

OTHER PUBLICATIONS

Optical Guide 5, Melles Griot, pp. 13-9-13-12.*

(Continued)

*Primary Examiner*—Leonidas Boutsikaris
(74) *Attorney, Agent, or Firm*—Blakely, Sokoloff, Taylor & Zafman LLP

(57) ABSTRACT

A method and apparatus is described to beam split or combine light for multiple fiber optic channels in a single device. Multiple light beams may enter the device through an array of fiber ports with each port having a collimating lens. The device includes a beamsplitter/combiner having a common optical aperture to simultaneously receive the light beams. The device may be used in laser amplification systems to combine lower power pump light beams into a single, higher power pump light beam.

16 Claims, 11 Drawing Sheets

FOREIGN PATENT DOCUMENTS

| | | | |
|---|---|---|---|
| JP | 63-95414 | 4/1988 | |
| JP | 64-18132 | 1/1989 | |
| JP | 04-096804 | 11/1993 | |
| JP | 05297323 | * 12/1993 | ................. 359/484 |
| JP | 6-53581 | 2/1994 | |
| JP | 6-118344 | 4/1994 | |

OTHER PUBLICATIONS

Optics Guide 5, Melles Griot, pp. 13-4, 14-5 to 14-16.*

Matsuura et al. "Production Engineering of Polarization Beam Combiner," Furukawa Review No. 20, Apr. 2001.

"OFC New Products Release: MEMS Products, Raman 14XX Pump Combiner, Isolator/Band Pass Filter, and more . . . " Mar. 5, 2001. Available at 111.diconfiberoptics.com/news/10.

OZ Optics, Ltd. "Laser Diode Power Combiner" Sep. 1999.

Fitel Data Sheet: "Polarization Beam Combiner." Jul. 2001.

Tokin Catalog, "Network Devices." Jul. 2001, vol. 1.

* cited by examiner

US 7,116,479 B1

ARRAY POLARIZATION BEAMSPLITTER AND COMBINER

FIELD OF THE INVENTION

This invention relates to the field of optical communications and, in particular, to optical components used in optical communications.

BACKGROUND

Beamsplitters/combiners are currently used in many applications such as broadband data communications. FIG. 1 illustrates a prior art system that uses multiple single channel beam combiners. Each single channel combiner includes two inputs, an output, and various micro-optic components such as a spatial walk-off polarizing crystal and collimators. The input collimator operates to focus light beams A and B received from the input fibers onto the spatial walk-off polarizing crystal.

A spatial walk-off polarizing crystal is a crystal of birefringent material that splits an unpolarized light beam into two orthogonally polarized light beams. When an anisotropic (birefringent) crystal is cut at a certain angle relative to its optical axis, the crystal will cause a component of light in a particular polarization direction to be diverted into a different path as it passes through the crystal. The amount of divergence is proportional to the thickness of the crystal. The direction that the polarization component is diverted is referred to as the walk-off direction of the crystal. A birefringent crystal, however, will only divert the polarization component in a polarization plane parallel to the walk-off direction and will not effect the polarization component in a plane perpendicular to the walk-off direction. In addition, a walk-off crystal is a reciprocal device such that the deviation angle of light passed through the crystal in a forward direction is opposite that of light passed through the crystal in a backward direction. In this manner, two orthogonally polarized light beams A and B are combined into a single light beam when passed through the spatial walk-off polarizing crystal in the direction from the input to the output fiber. The single beam is propagated to an output collimator that focuses the single beam into the output fiber.

Such single channel beam combiners typically have a cylindrical shape that may be 65 mm in length and 5 mm in diameter. The spatial walk-off polarizing crystals used in these beam combiners may each run on the order of a few hundred dollars and may only be available from only a limited number of vendors. As such, one problem with such micro-optic combiners is their increased manufacturing cost. The increased manufacturing cost is due not only to the multiple individual assemblies that are required for each channel, but also the high cost of the crystals (e.g., spatial walk-off polarizing crystal) used in these combiners. When many of these crystals are required for construction of multiple micro-optic combiners, the increasing cost greatly detracts from the desirability of these devices. In addition, their limited availability may also make these micro-optic combiners undesirable due to possible supply shortages.

Another problem with such micro-optic devices is that they have very large dimensions, making them undesirable for use in systems that require small device geometries.

SUMMARY OF THE INVENTION

The present invention pertains to a polarizing beamsplitter/combiner array. In one embodiment, the array includes a housing having a plurality of ports with each of the plurality of ports configured to receive a fiber. The array may also include a plurality of collimating lenses disposed within the housing with each of the plurality of collimating lenses configured to receive a light beam from a corresponding port of the plurality of ports. The array also includes a beamsplitter/combiner coupled to the plurality of collimating lenses to receive the light beam from each of the plurality of collimating lenses, the beamsplitter/combiner has a common optical aperture disposed on an outer surface area to simultaneously receive the light beams received from each of the plurality of collimating lenses.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus is described to beam split or combine light for multiple fiber optic channels using a single device. The device components may be contained within a single housing. Light may enter the device through an array of fiber ports with each port having a collimating lens. The light is propagated through a common optical aperture with the propagation of light for each of the channels being substantially parallel to each other. In one embodiment, the common optical aperture may be disposed on an outer surface area of a polarizing beamsplitter such as a rhombic prism having a polarizing beamsplitter coating. Alternatively, the common optical aperture may be disposed on a reflective polarizer plate. The device may be used, for example, in laser amplification systems to combine lower power pump light beams into a single, higher power pump light beam.

Figure 2:
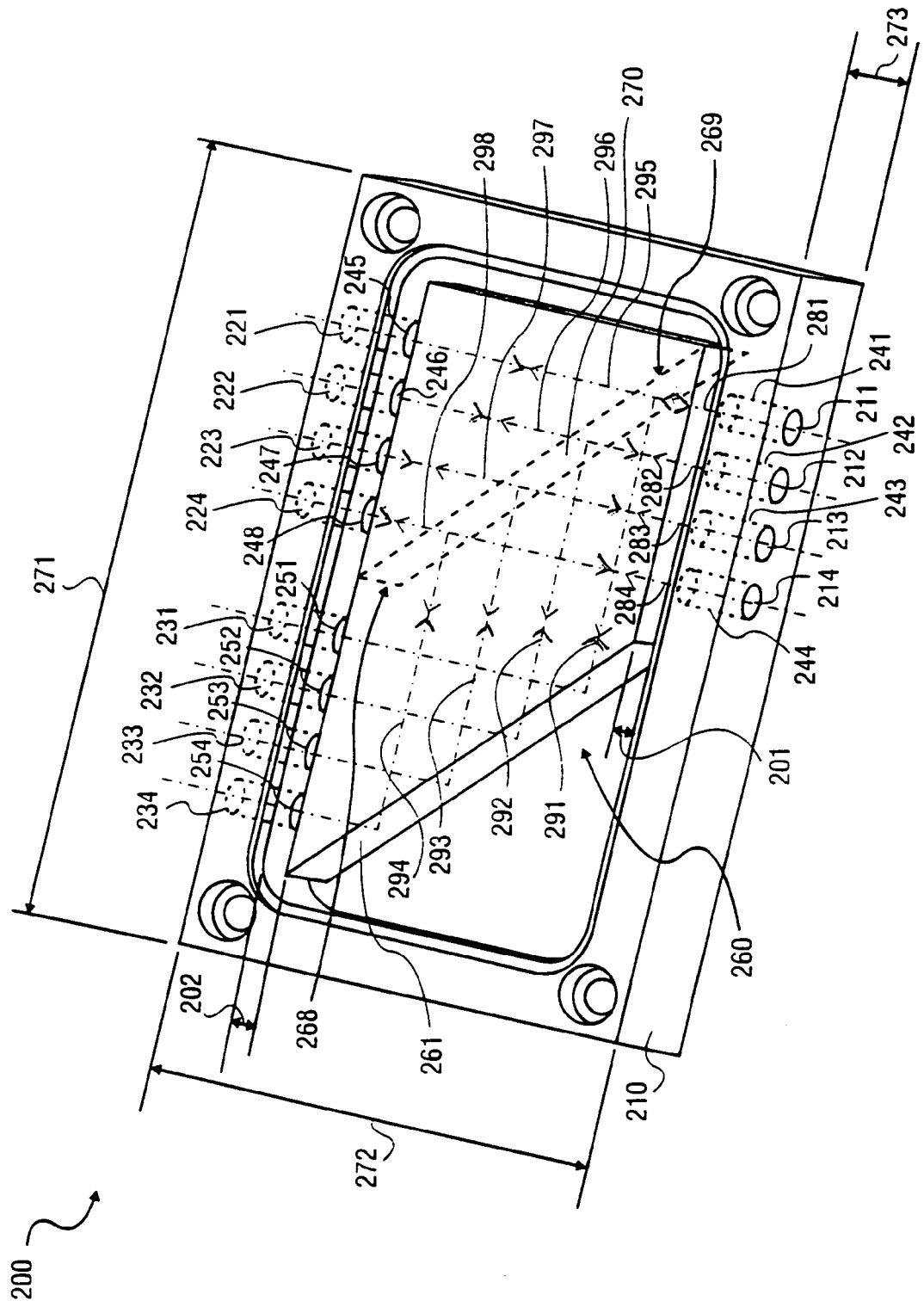
FIG. 2 illustrates one embodiment of an array polarization beamsplitter/combiner.

FIG. 2 illustrates one embodiment of a beamsplitter/combiner array. Array 200 operates to simultaneously combine or split light on multiple channels depending the direction of light propagation through array 200. Array 200 is shown having 4 channels only for ease of discussion. In alternative embodiment, array 200 may be a multi-channel array having more or less than 4 channels.

Beamsplitter/combiner array 200 includes housing 210 having multiple ports 211–214, 221–224, and 231–234 that may be coupled to fibers (not shown). Housing 200 may be constructed out of a rigid material, such as aluminum. In one embodiment, the material of housing 200 may be selected for thermal stability and thermally matched the material used for beamsplitter/combiner 260.

When array 200 is operating as a beamsplitter, light beams are received through ports 211–214 and are propagated through the device to ports 221–224 and 231–234. In such a configuration, ports 211–214 may be referred to as input ports and ports 221–224 and 231–234 may be referred to as output ports. Input ports 211–214 may be coupled to receive light beams from input fibers and propagate portions of the light beams to corresponding output fibers through output ports 221–224 and 231–234.

When array 200 is operating as a beam combiner, light beams are received through ports 221–224, 231–234 and propagated through the device to ports 211–214. In such a configuration, ports 211–214 may be referred to as output ports and ports 221–224, 231–234 may be referred to as input ports. In this configuration, input ports 221–224, 231–234 receive light beams from input fibers and combine the light beams together for propagation to corresponding output fibers through output ports 211–214. Whether operating as a beamsplitter or a beam combiner, the light received from the multiple ports that are simultaneously propagated through array 200 share a common optical aperture, as discussed below.

The operation of array 200 as a beamsplitter is now discussed. In one embodiment, array 200 also includes collimators 241–244, 245–248, and 251–254, and beamsplitter 260. Collimators 241–244 are coupled to ports 211–214. Collimators 241–244 operate to receive light beams from fiber coupled to ports 211–214 and focus the light beams to beamsplitter 260. Collimators 241–244 may be individual collimators or, alternatively, combined within a single collimator array. In one embodiment, collimators may be GRIN lenses. Collimators are available from industry manufacturers such as NSG, of Japan. Collimators are known in the art; accordingly, a detailed description is not provided. In yet another embodiment, the collimators may integrated collimators having fused fibers. Integrated collimators are available from Light Path Technology of Warren, N.J.

Light 281–284 received through ports 211–214 may be linearly polarized light. Linearly polarized light is characterized by two plane-polarized beams: one beam with its electric field parallel to the plane of incidence (horizontal or P-polarized) and the other beam with its electric field perpendicular to the plane of incidence (vertical or S-polarized).

In one embodiment, beamsplitter 260 is polarizing beamsplitter that has one or more layer polarizing beamsplitter (PBS) coating 270 on its inner surface that acts to separate the S-polarized and P-polarized components of light 281–284 into spatially separate beams. The coating 270 on the inner surface 268 of beamsplitter 260 operates to reflect light based on its polarization, such that S-polarized light is reflected and P-polarized light is transmitted. The S-polarized light beams 291–294 are reflected to side 261 of beamsplitter 260. The side 261 of polarizing beamsplitter 260 is a reflective element that acts as a mirror to reflect the S-polarized light beams 291–294 such that they are propagated to collimating lenses 251–254. Side 261 mirror reflection may be created by a coating on that side, or by total internal reflection. Collimating lenses 251–254 collimate light beams 291–294 into corresponding output fibers. The P-polarized light beams 295–298 are refracted to collimating lenses 245–248.

In this manner, the S-linear polarized light received through port 241 is output as substantially pure S-polarized light through port 251 and the P-linear polarized component of light received through port 241 is output as substantially pure P-polarized light through port 245. Likewise, linearly polarized light beams received through ports 242, 243, and 244 are divided by polarization, with S-polarized components outputted through ports 252–254, respectively, and P-polarized components outputted through ports 246–248, respectively.

A polarizing coating 270 may be applied to one of prism surfaces 268 or 269 to form beamsplitter 260. Then, the beamsplitter 260 surfaces may be cemented or optically contacted together. A composite optical system is thereby formed by the interfaces of surfaces 268 and 269 and coating 270. Generally, an adhesive is chosen that accurately mimics the index of refraction of beamsplitter 260 so that it is optically integral to one of the surfaces 268 or 269.

Anti-reflection (AR) coatings may reside on some component surfaces through which light is propagated. AR coatings may be placed on the normally incident surfaces of beams splitter 260 adjacent to collimators 241–244, 245–248, and 251–254. Light beams propagated by collimators 241–244, 245–248, and 251–254 jump an air gap, for example, air gap 201 between the beamsplitter 260 and collimators 245–248, and 251–254. The air-glass interface associated with the entrance, or exit, of light from either beamsplitter 260, or a collimator, may induce an optical loss that depends on the index of refraction of the material used for the components. In one embodiment, for example, the optical loss may be 4–20%. AR coatings of single or multiple layers may be applied on the air-glass interfaces may reduce such optical loss. Commercially available collimators are often AR coated to reduce optical loss.

In one embodiment, beamsplitter 260 may be a rhombic prism. In another embodiment, other types of prisms may be used, for example, a Glan Thompson crystal polarizing prism or other types of polarizing prisms whose input and output apertures are so disposed as to admit multi-channel fiber coupling with input fiber sharing the same input aperture and outputs sharing the same output aperture. In one embodiment, the prism may be composed partially, or wholly, of birefringent crystal materials. Alternatively, the prism may not include birefringent crystal material (e.g., the prism may be constructed using glass).

Figure 3:
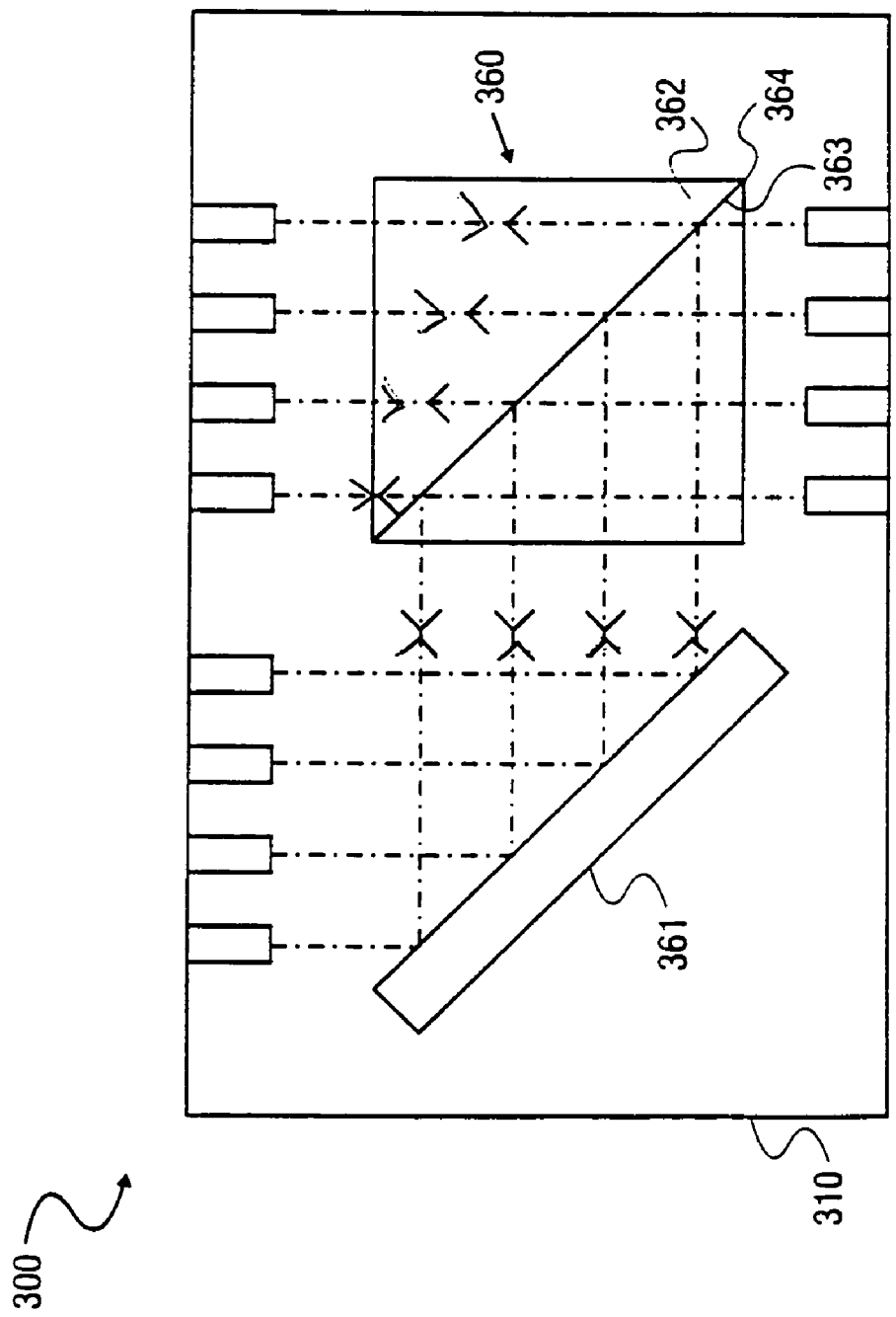
FIG. 3 illustrates an alternative embodiment of an array polarization beamsplitter/combiner.

In an alternative embodiment, other types of reflective thin film polarizing beamsplitters may be used, for example, a cubic beamsplitter 360 used in combination with a reflective element 361 such as a mirror or plate reflector, as illustrated in FIG. 3. Cubic beamsplitter 360 is disposed within housing 310 of array 300. Cubic beamsplitter 360 has a matched pair of right angle prisms 362 and 363 that are optically coupled or physically coupled together with an epoxy. The hypotenuse 364 of one of prisms 362 and 363 has a polarizing beamsplitter coating. Beamsplitters and mirrors are known in the art; accordingly, a detailed discussion is not provided herein.

In one embodiment, the optical components of array 200 may be physically coupled together using, for example, an epoxy. In an alternative embodiment, the optical components of array 200 may be optically coupled together such that a glass-air interface may exist between some of the components.

Figure 10:
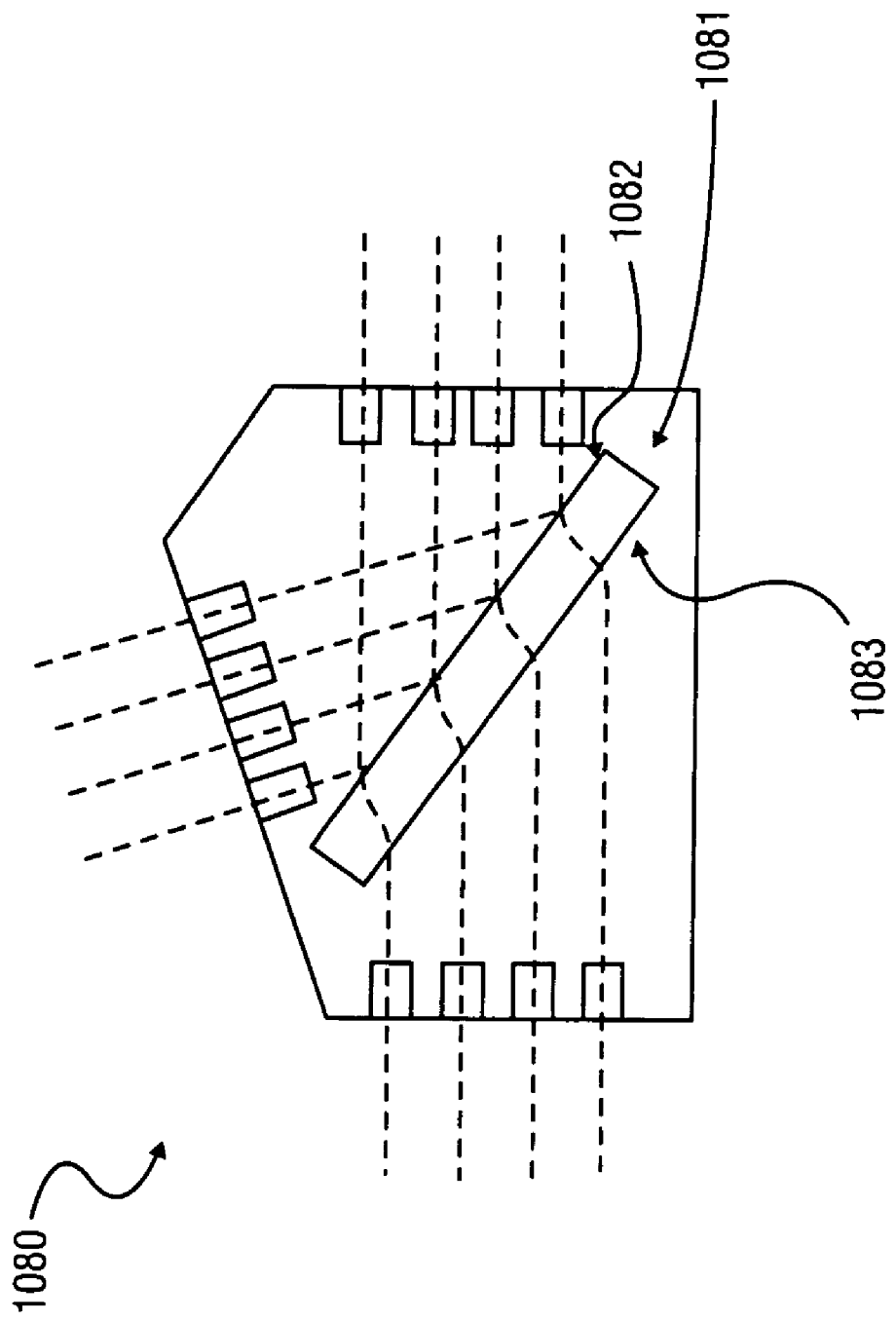
FIG. 10 illustrates yet another embodiment of an array polarization beamsplitter/combiner.

FIG. 10 illustrates yet another embodiment of an array polarization beamsplitter/combiner. Array splitter/combiner 1080 contains single reflective polarizer plate 1081. Polarization coating 1082 reflects S-polarized light and transmits P-polarized light. An optional AR coating 1083 may be used to improve the transmission of the transmitted P-polarized beam. AR coating 1083 may be omitted if plate 1081 is disposed at the Brewster's Angle to the P-polarized beam. Brewster's angle is the angle of incident light at which any P-polarized component of incident light is absent in reflected light for a particular refractive index of plate 1081. In another embodiment, one or more reflective mirrors may be included in splitter/combiner 1080 to dispose the input and/or output beams into more useful directions that do not depend on the optimum angle of incidence of the P-polarized beam with respect to polarizer plate 1081.

Referring again to FIG. 2, beamsplitter 260 may be constructed from a high index glass, such as SF2 of SF11. In another embodiment, other materials may be used, for example, beamsplitter 260 may be constructed from BK7 glass or undoped YAG crystal. Prisms and coatings are available from industry manufacturers such as CVI of New Mexico.

When array 200 is operating as a beam combiner, light beams are received through ports 221–224 and 231–234 and propagated through the device to ports 211–214. In such a configuration, beamsplitter 260 operates to combine light beams together for propagation to corresponding output fibers through ports 211–214.

When array 200 is used as a beamsplitter, all the input and output fibers may be polarization maintaining fibers. When array 200 is used as a beam combiner, the input fibers may be polarization maintaining fibers and the output fibers may be standard telecommunication fibers. A polarization maintaining fiber operates to preserve the polarization states of the reflected light beams through the optical path of the beamsplitter/combiner.

Beamsplitter 260 has a larger clear aperture on outer surfaces 201 and 202 than the fiber mode that enables the apertures to be shared in a non-competing/non-interfering way by the multiple channel fibers simultaneously in a single device. The size of the apertures increases linearly with area. The number of channels that may be handled by the array polarization beam splitter also varies linearly with aperture. However, the manufacturing cost of such a single internal optic (which may include polishing, coating and assembly steps) and the manufacturing cost of the single housing may rise much more slowly than the aperture size and, hence, the number of channels. Therefore, the cost per channel of the array polarization beamsplitter/combiner may be less than the cost per channel of multiple individual crystal polarizing beamsplitters/combiners.

In one embodiment, beamsplitter 260 may employ a single internal polarizing optic constructed of readily available optical glass. The manufacturing cost of such an optic constructed with readily available optical glass rises much more slowly than the large clear aperture and, hence, the number of channels that may be handled by, the beamsplitter. In addition, such an optic may also be available from multiple sources. Therefore, the cost per channel in this embodiment may be much lower than the cost per channel of multiple individual crystal polarizing beamsplitters/combiners.

Figure 1:
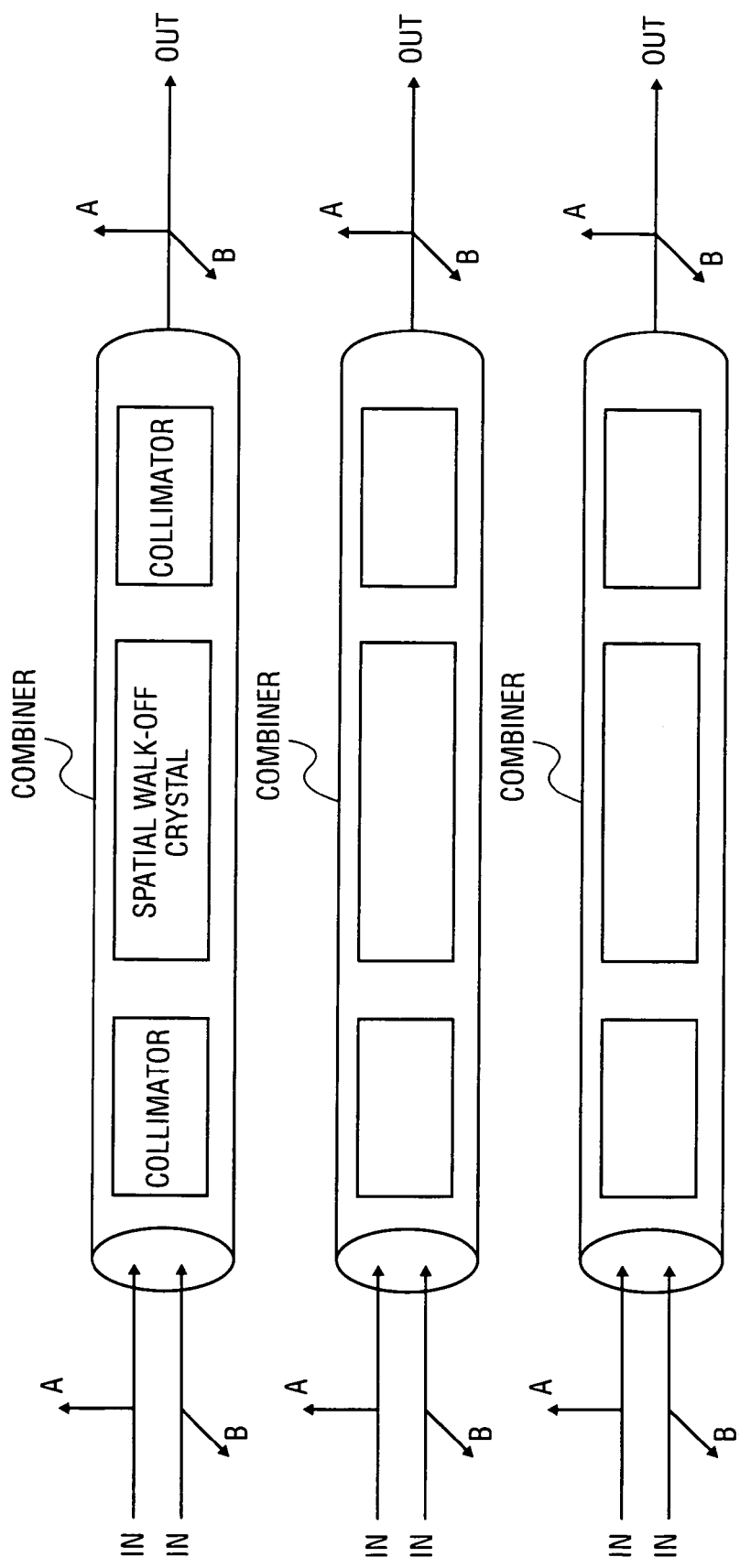
FIG. 1 illustrates a prior art system that uses multiple single channel beam combiners.

Another advantage of array 200 over that of the device of FIG. 1 is that array 200 may be manufactured more compactly than the combination of multiple single channel devices of FIG. 1. Although beamsplitter 260, by itself, may be larger in size than a single walk-off crystal used in each of the devices of FIG. 1, the sharing of a common optical aperture disposed on beamsplitter 260 by multiple fibers enables the construction of a smaller overall array 200 than the combined sizes of the multiple single channel devices of FIG. 1. In particular, the length of array 200 may be significantly shorter than the length of the single channel devices of FIG. 1 (e.g., less than 65 mm). In one embodiment, for example, array 200 may have a width of 271 of approximately 66 mm, a length 272 of approximately 40 mm, and a height 273 of approximately 12 mm. It should be noted that these dimensions are only exemplary. In an alternative embodiment, array 200 may have other dimensions.

Moreover, with a similar amount of manufacturing resources (e.g., factory space and labor) it may be quicker and cheaper to manufacture (e.g., component alignment and package sealing) multiple optic channels in a single device than to manufacture multiple single channel devices.

Figure 11:
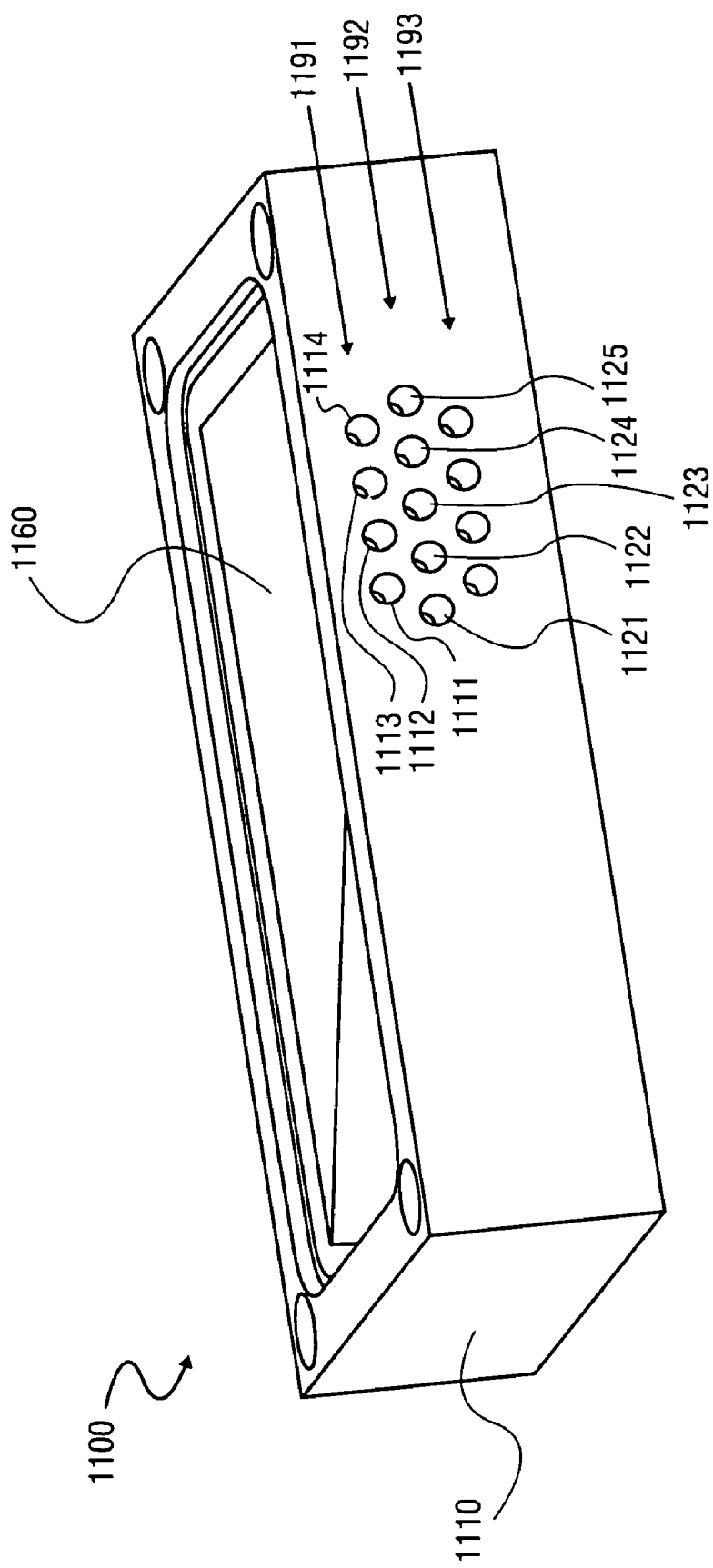
FIG. 11 illustrates an alternative embodiment of an array polarization beamsplitter/combiner having a two dimensional port array.

FIG. 11 illustrates an alternative embodiment of an array polarization beamsplitter/combiner having a two dimensional port array. Beamsplitter/combiner array 1100 may operate in a manner similar to the beamsplitter/combiner arrays 200, 300, and 1080 discussed above in relation to f FIGS. 2, 3, and 10, respectively. In one embodiment, beamsplitter/combiner array 1100 includes a single housing 1110 having ports that are arranged in two dimensional arrays, with the ports arrayed in planes parallel to the input and output optical apertures of the beamsplitter 1160. In other words, the ports may be arranged in linear (single dimension) rows that are stacked on top of each other. For example, beamsplitter/combiner array 1100 may include a first row 1191 of ports (e.g., having ports 1111–1114), a second row 1192 of ports (e.g., having ports 1121–1125), and a third row of ports 1193. In one embodiment, the ports in adjacent rows (e.g., rows 1191 and 1192) may be offset from one another in a hexagonal formation in order to increase the density of ports that may be positioned in housing 1110. Alternatively, other two-dimensional port formations may be used. It should be noted that rows 1191–1193 and their corresponding ports may represent either input or output port rows of beamsplitter/combiner array 1100.

Figure 4:
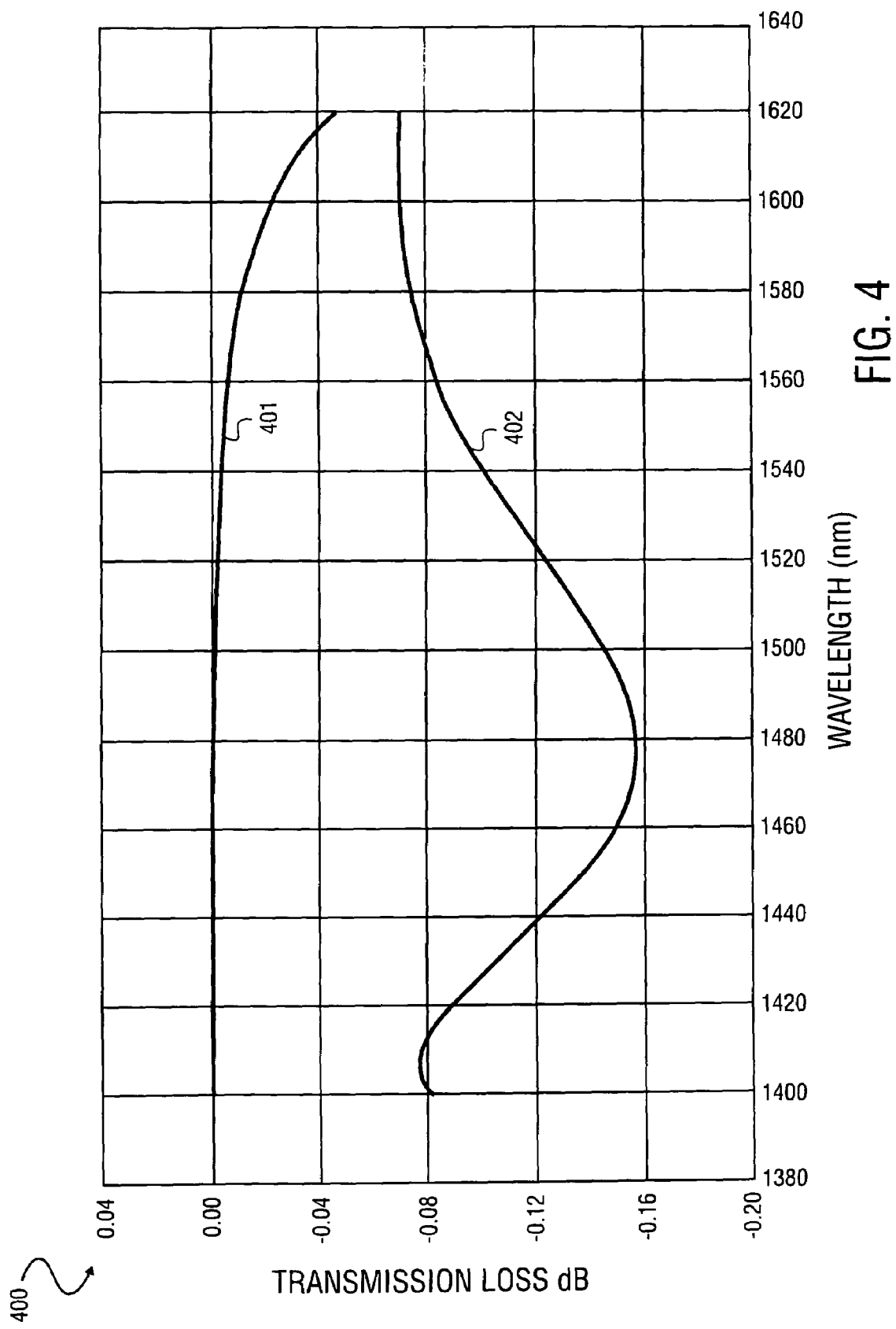
FIG. 4 is a graph illustrating one embodiment of theoretical wavelength v transmission loss for light propagated through an array constructed from BK7 prism material.

FIG. 4 is a graph illustrating one embodiment of theoretical wavelength v transmission loss for light propagated through an array constructed from BK7 prism material. The horizontal axis of graph 400 is the wavelength of light in nanometers (nm). The vertical axis of graph 400 is the transmission loss through the BK7 based array in decibels (dB). Curve 401 shows the transmission loss in dB for the S-polarized component propagating through the array.

Curve 402 shows the transmission loss in dB for the P-polarized component propagating through the array.

Figure 5:
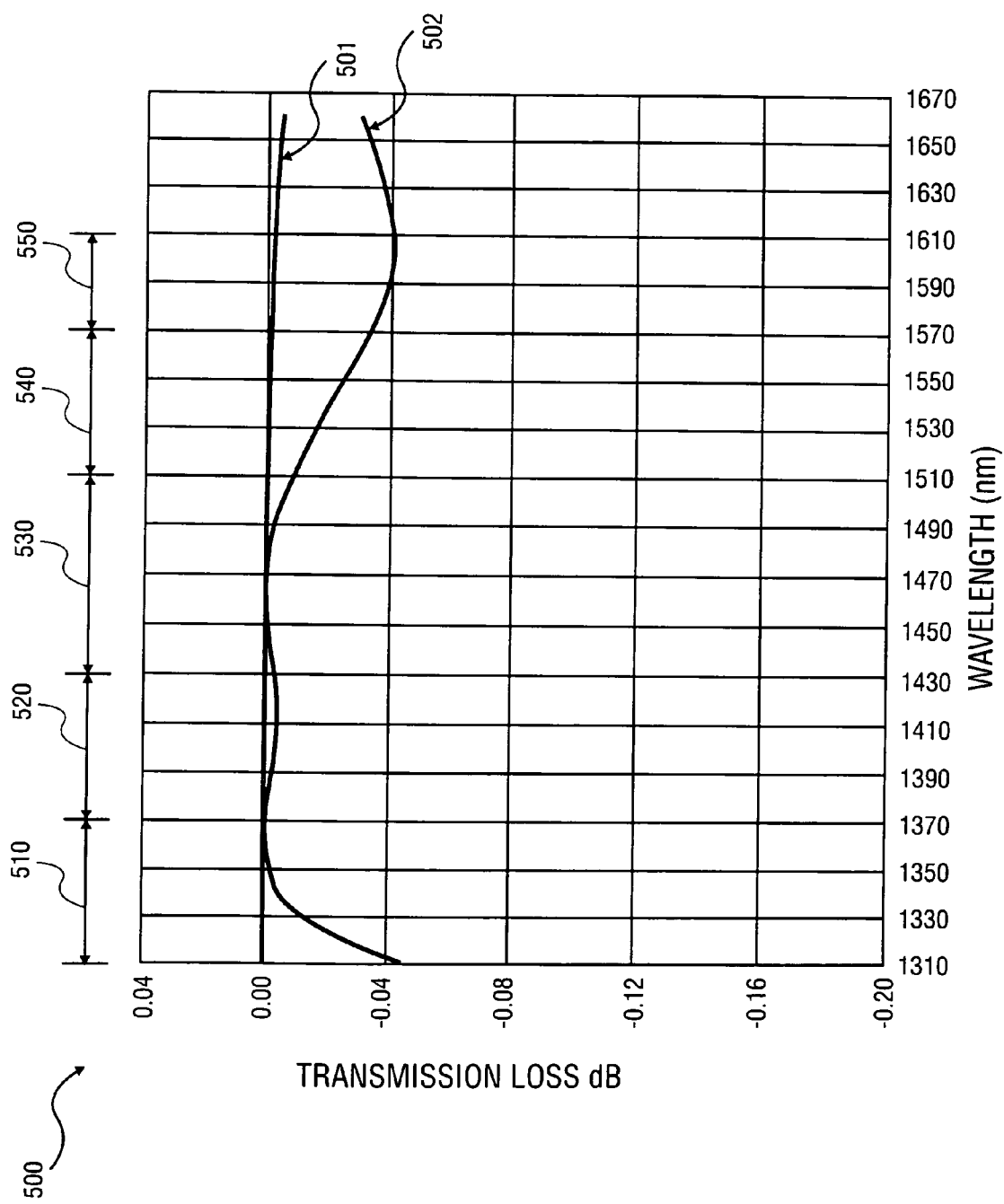
FIG. 5 is a graph illustrating one embodiment of theoretical wavelength v transmission loss for light propagated through an array constructed from SF2 prism material.

FIG. 5 is a graph illustrating one embodiment of theoretical wavelength v transmission loss for light propagated through an array constructed from SF2 prism material. The horizontal axis of graph 500 is the wavelength of light in nanometers (nm). The vertical axis of graph 500 is the transmission loss through the SF2 based array in decibels (dB). Curve 501 shows the transmission loss in dB for the S-polarized component propagating through the array. Curve 502 shows the transmission loss in the dB for the P-polarized component propagating through the array. FIG. 5 shows that any array polarization beamsplitter/combiner containing suitably constructed prisms 260 of FIG. 2 or 360 of FIG. 3 may be used over a wide wavelength band range.

Referring to FIG. 5, for example, band 510 is approximately the Metro Band; band 520 is approximately the Raman Pumping Band; band 530 is approximately the S-Band; band 540 is approximately the C-Band; and band 550 is approximately the L-Band. It should be noted that the wavelength band ranges noted above are only approximations and that the wavelength ranges for the different bands may be overlapping.

As such, arrays 200, 300, and 1080 of FIGS. 2, 3, and 10, respectively, may be used in various systems, for examples, the laser and Raman amplifications systems discussed below in relation to FIGS. 6–9.

Figure 6:
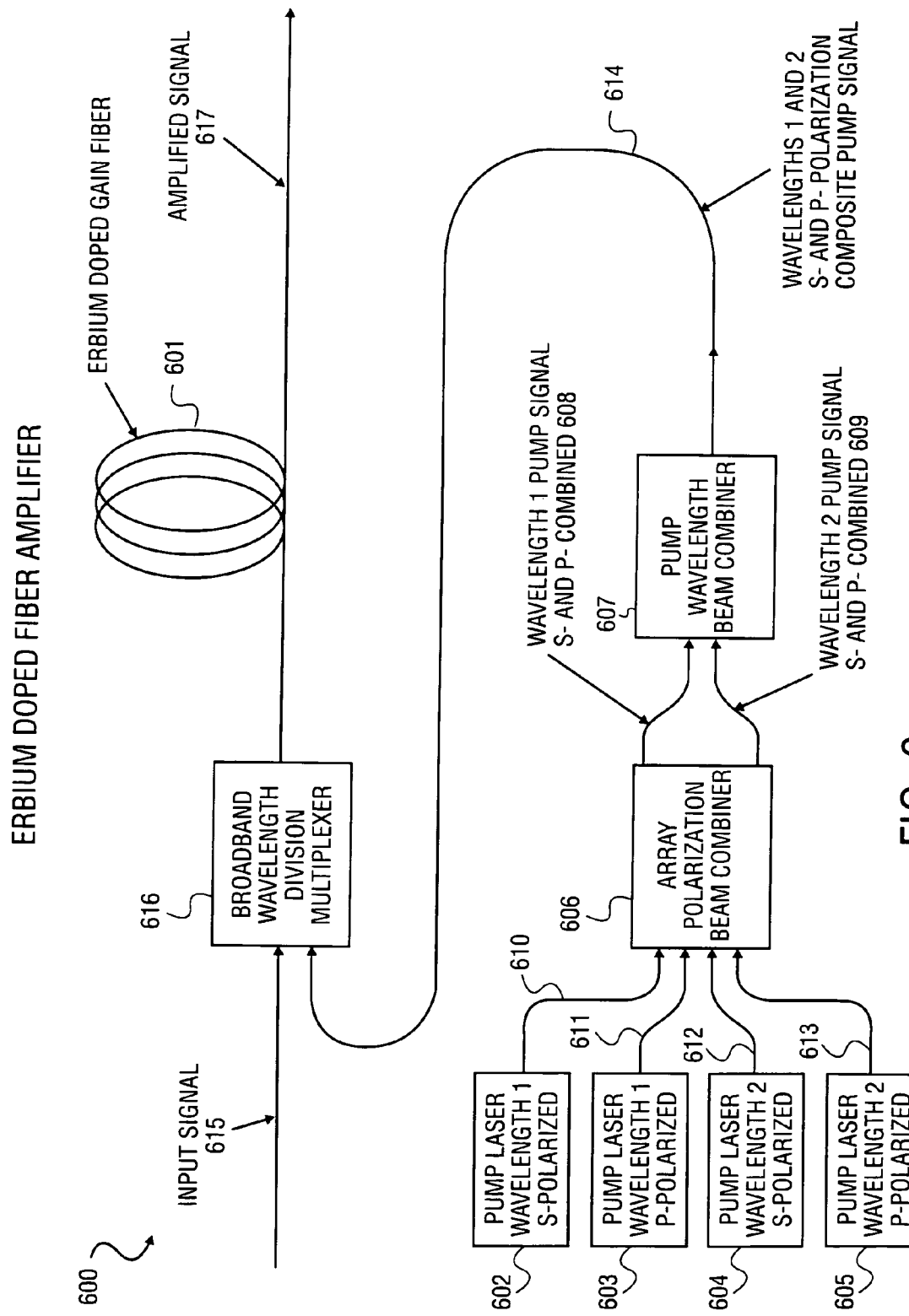
FIG. 6 illustrates one embodiment of an Erbium doped fiber amplification system.

FIG. 6 illustrates one embodiment of an Erbium doped fiber amplification system. In this system, Erbium-doped gain fiber 601 is the laser gain medium. The laser amplification system 600 may include a plurality of low power pump lasers 602–605. Array polarization beam combiner 606 may be used to combine orthogonally S- and P-polarized pump lasers into composite beams, thereby increasing the pumping power in the output fiber 617. The number of pump lasers is limited only by the number of array inputs. Four pump lasers are shown in amplifier 600 only for ease of discussion. In an alternative embodiment, laser amplification system 600 may be constructed with a larger or smaller number of pump lasers.

Pump lasers 602–604 are properly polarized at the input to array 606. In amplification system 600, array polarization beam combiner 606 is used to combine orthogonally polarized components 610 and 611 of a particular wavelength ("wavelength 1") into composite higher power wavelength 1 output beam 608. Concurrently, array 606 combines orthogonally polarized components 612 and 613 of a different wavelength ("wavelength 2") into composite higher power wavelength 2 output beam 609. Pump wavelength beam combiner 607 then creates higher power composite pump beam 614, which is combined with input signal 615 in broadband wavelength division multiplexer 616. The output of multiplexer 616 is propagated into Erbium-doped gain fiber 601 that generates an amplified signal 617.

Figure 7:
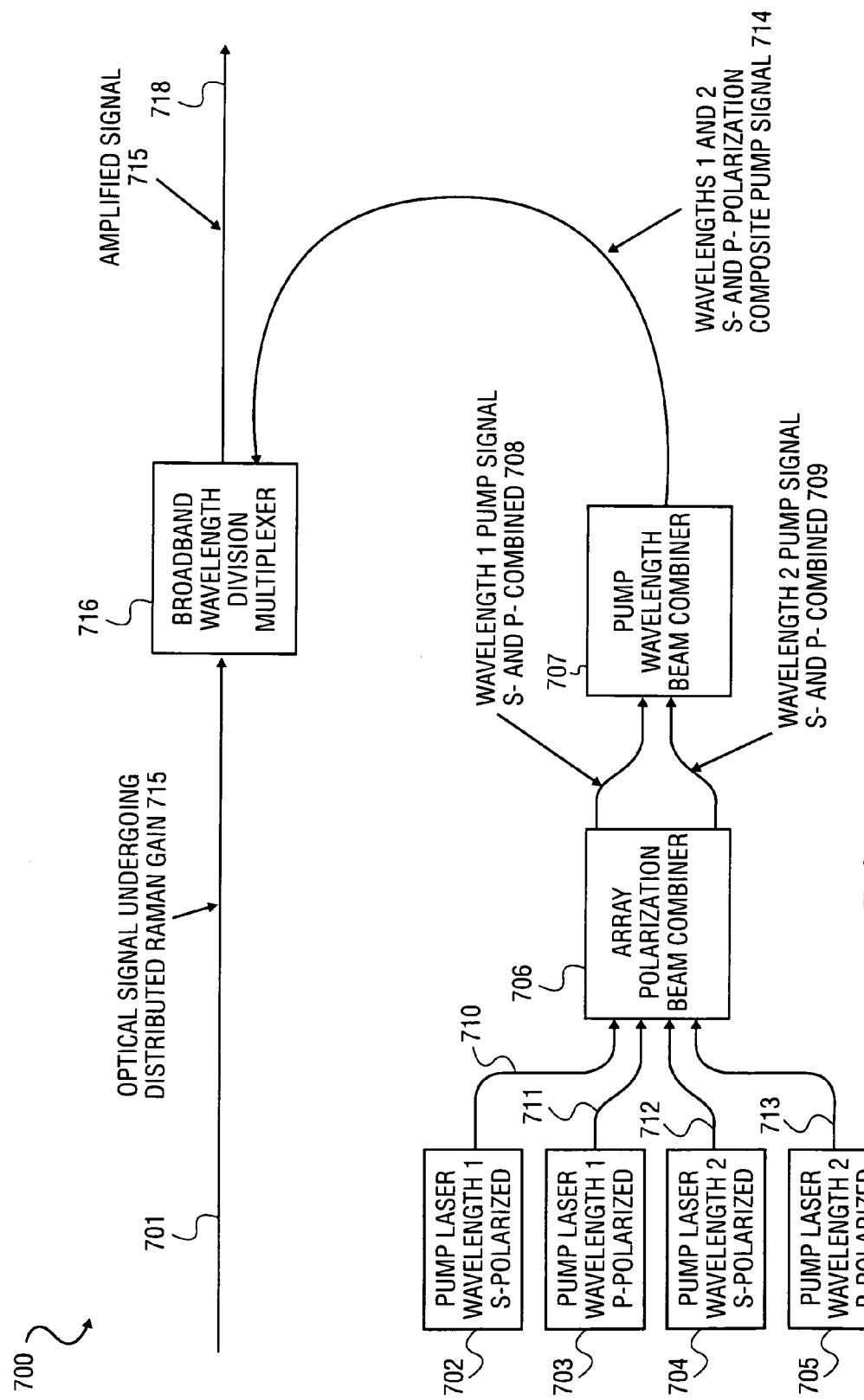
FIG. 7 illustrates one embodiment of a Raman amplification system.

FIG. 7 illustrates one embodiment of a Raman amplification system. In Raman amplifier system 700, distributed Raman amplification occurs in fiber 701 containing the propagating signal 715. Composite pumping beam 714 is applied to fiber 701 in the backward direction through broadband wavelength division multiplexer 716. In an alternative embodiment, forward amplification may be arranged by reversing the direction of coupling of pump beam 714 through 716 to be copropagating with signal 715.

The laser amplification system 700 may include a plurality of low power pump lasers 702–705. Array polarization beam combiner 706 may be used to combine orthogonally S-polarized and P-polarized pump lasers into composite beams, thereby increasing the pumping power in output fiber 718. The number of pump lasers is limited only by the number of array inputs. Four pump lasers are shown in amplifier 700 only for ease of discussion. A system may be constructed with a larger or smaller number of pump lasers. The pump lasers are properly polarized at the input to array 706.

In amplification system 700, array polarization beam combiner 706 is used to combine orthogonally polarized components 710 and 711 of a wavelength 1 into composite higher power wavelength 1 output beam 708. Concurrently, array polarization beam combiner 706 combines orthogonally polarized components 712 and 713 of wavelength 2 into composite higher power wavelength 2 output beam 709. Pump wavelength beam combiner 707 then creates higher power composite pump beam 714, which is applied to fiber 701 in the backward direction through broadband wavelength division multiplexer 716 to generate amplified signal 715.

It should be noted that an array polarization beam combiner may also be used in amplifications systems to combine orthogonally polarized beams of differing wavelengths. In this manner, an array polarization beam combiner can function as a wavelength division multiplexer.

Figure 8:
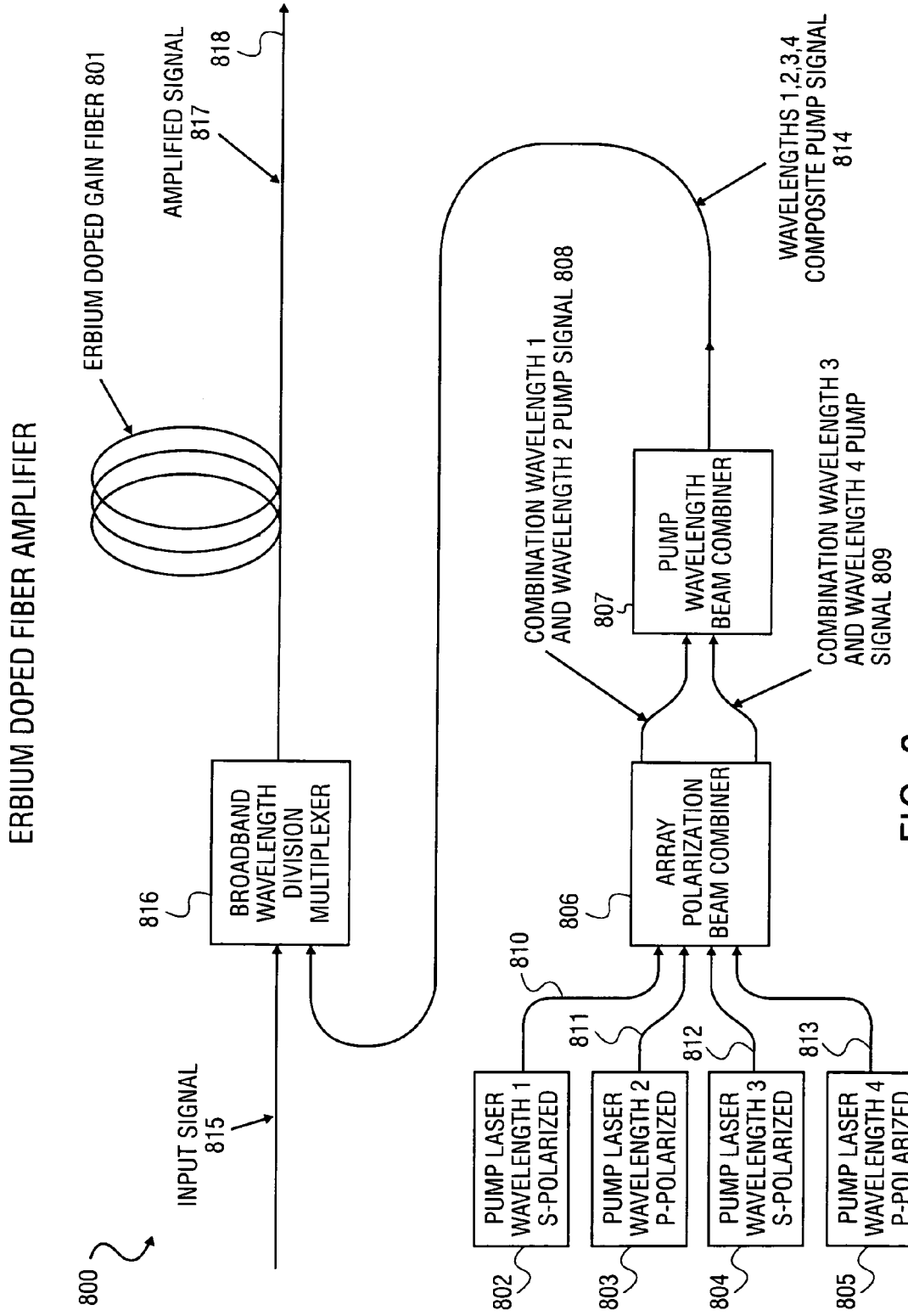
FIG. 8 illustrates another embodiment of an Erbium doped fiber amplification system.

FIG. 8 illustrates another embodiment of an Erbium doped fiber amplification system. In laser amplification system 800, Erbium-doped gain fiber 801 is the laser gain medium. The laser amplification system 800 may include a plurality of low power pump lasers 802–805 of differing wavelengths. Array polarization beam combiner 806 may be used to combine orthogonally S-polarized and P-polarized pump lasers into composite beams, thereby increasing the pumping power in the output fiber 818. The number of pump lasers is limited only by the number of array inputs. Four pump lasers are shown in amplification system 800 only for ease of discussion. In an alternative embodiment, laser amplification system 800 could be constructed with a larger or smaller number of pump lasers. The pump lasers are properly polarized at the input to array 806. In amplification system 800, array polarization beam combiner 806 is used to combine orthogonally polarized components 810 and 811 of wavelengths 1 and 2, respectively, into a composite higher power beam 808. Concurrently, array polarization beam combiner 806 combines orthogonally polarized components 812 and 813 of wavelengths 3 and 4, respectively, into composite higher power output beam 809. Pump wavelength beam combiner 807 then creates higher power composite pump beam 814, which is combined with input signal 815 in broadband wavelength division multiplexer 816. The output of multiplexer 816 is propagated into Erbium-doped gain fiber 801 that generates an amplified signal 817 in output fiber 818.

It should be noted that if there are only two pump lasers, for example, 802 and 803, then pump wavelength beam combiner 807 may be eliminated, its operation being accomplished by array polarization beam combiner 806. It should also be noted that any set or combination of N wavelengths can be combined two at a time by array polarization beam combiner 806 provided the wavelengths are arranged in orthogonally polarized pairs.

Figure 9:
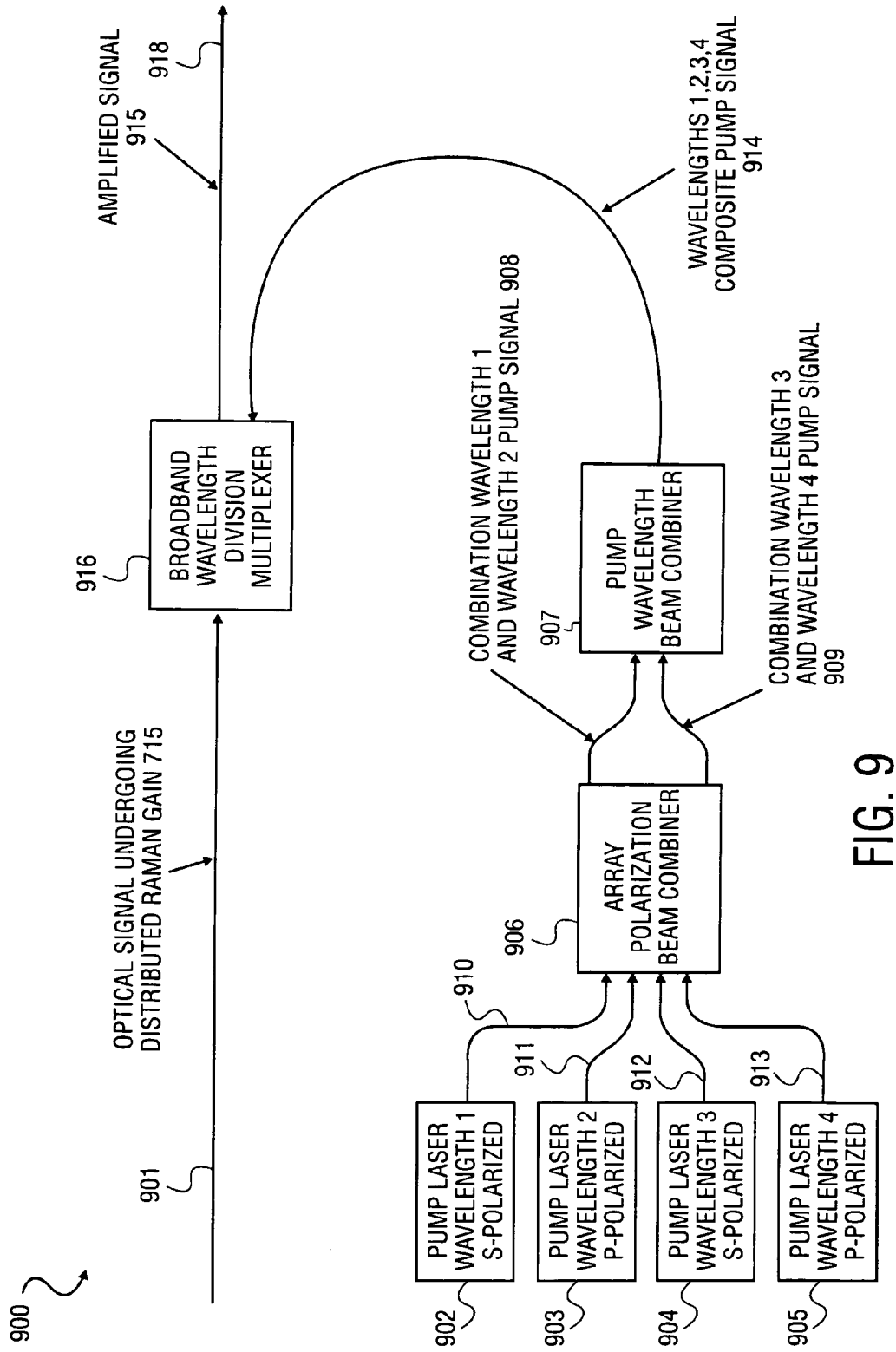
FIG. 9 illustrates another embodiment of a Raman amplification system.

FIG. 9 illustrates another embodiment of a Raman amplification system. In Raman amplification system 900, distributed Raman amplification occurs in the fiber 901 containing the propagating signal 915. Composite pumping beam 914 is applied to fiber 901 in the backward direction through broadband wavelength division multiplexer 916. In an alternative embodiment, forward amplification may be arranged by reversing the direction of coupling of pump beam 914 through 916 to be copropagating with signal 915.

The laser amplification system 900 may include a plurality of low power pump lasers 902–905. Array polarization beam combiner 906 may be used to combine orthogonally S-polarized and P-polarized pump lasers into composite beams, thereby increasing the pumping power in the output fiber. The number of pump lasers is limited only by the number of array inputs. Four pump lasers are shown in amplifier 900 only for ease of discussion. In an alternative embodiment, Raman amplification system 900 may be constructed with a larger or smaller number of pump lasers. The pump lasers are properly polarized at the input to array 906.

In amplification system 900, array polarization beam combiner 906 is used to combine orthogonally polarized components 910 and 911 of wavelengths 1 and 2, respectively, into composite higher beam power 908. Concurrently, array polarization beam combiner 906 combines orthogonally polarized components 912 and 313 of wavelengths 3 and 4, respectively, into composite higher power output beam 909. Pump wavelength beam combiner 907 then creates higher power composite pump beam 914, which is applied to fiber 901 in the backward direction through broadband wavelength division multiplexer 916 to generate amplified signal 915 in output fiber 918.

It should be noted that if there are only two pump lasers, for example, 902 and 903, then pump wavelength beam combiner 907 may be eliminated, its function being accomplished by array polarization beam combiner 906. It should also be noted that any set or combination of N wavelengths can be combined two at a time by array polarization beam combiner 906 provided the wavelengths are arranged in orthogonally polarized pairs.

Pump lasers, pump wavelength beam combiners, wavelength division multiplexers, and Erbium doped gain fibers are known in the art; accordingly, a detailed discussion of them is not provided herein.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a housing having a plurality of at least four ports, each of the plurality of ports coupled to a corresponding one of a plurality of at least four fibers;
a plurality of collimating lenses disposed within the housing, each of the plurality of collimating lenses to receive a respective one of at least four light beams from a corresponding port of the plurality of at least four ports; and
a beamsplitter coupled to the plurality of collimating lenses to receive the light beam from each of the plurality of collimating lenses, the beamsplitter having a common optical aperture disposed on an outer surface area to simultaneously receive the four light beams, on the outer surface area of the common optical aperture, from each of the plurality of collimating lenses, wherein the beamsplitter comprises a prism, and wherein the beamsplitter has an inner surface and each of the light beams have a P-polarized and a S-polarized component, and wherein the beamsplitter has a coating on the inner surface to separate the S-polarized and P-polarized components of the light beam into spatially separate beams.

2. An apparatus, comprising:
a housing having a plurality of at least four ports, each of the plurality of ports coupled to a corresponding one of a plurality of at least four fibers;
a plurality of collimating lenses disposed within the housing, each of the plurality of collimating lenses to receive a light beam from a corresponding port of the plurality of at least four ports; and
a beamsplitter coupled to the plurality of collimating lenses to receive the light beam from each of the plurality of collimating lenses, the beamsplitter having a common optical aperture disposed on an outer surface area to simultaneously receive the light beams received from each of the plurality of collimating lenses, wherein the beamsplitter comprises a prism, and wherein the plurality of ports comprises a first input port and a second input port, the plurality of collimating lenses comprises a first collimating lens and a second collimating lens, and wherein the beamsplitter is coupled to receive a first light beam from the first collimating lens and a second light beam from the second collimating lens, wherein each of the first and second light beams have a P-polarized and a S-polarized component, and wherein the beamsplitter has a coating to separate the S-polarized and P-polarized components of each of the first and second light beams into spatially separate beams.

3. The apparatus of claim 2, wherein the beamsplitter comprises a reflective element to receive the S-polarized beam of each of the first and second light beams and direct the S-polarized beams to respective output collimating lenses.

4. The apparatus of claim 2, wherein the beamsplitter is configured to propagate the P-polarized beam of each of the first and second light beams to respective output collimating lenses.

5. The apparatus of claim 2, wherein the beamsplitter is constructed from a high index glass material.

6. An apparatus, comprising:
a housing having a plurality of ports, each of the plurality of ports to receive a corresponding fiber;
a plurality of collimating lenses disposed within the housing, each of the plurality of collimating lenses to receive a light beam from a corresponding port of the plurality of ports; and
a beamsplitter coupled to the plurality of collimating lenses to receive the light beam from each of the plurality of collimating lenses, the beamsplitter having a common optical aperture disposed on an outer surface area to simultaneously receive the light beams received from each of the plurality of collimating lenses, wherein the plurality of ports comprises first, second, third, and fourth input ports and first and second output ports, and wherein the beamsplitter is coupled to receive S-polarized light from the first and third input ports and P-polarized light from the second and fourth input ports, the beamsplitter to combine, into the first output port, S-polarized light from the first input port with P-polarized light from the second input port, the beamsplitter to combine, into the second output port, S-polarized light from the third input port with P-polarized light from the fourth input port.

7. The apparatus of claim 6, wherein the propagation of light from each of the input ports is substantially parallel to each other.

8. The apparatus of claim 6, wherein the housing has a length of less than approximately 65 millimeters.

9. The apparatus of claim 6, wherein the plurality of collimating lenses are GRIN lenses.

10. The apparatus of claim 6, wherein the housing is constructed of aluminum.

11. The apparatus of claim 6, wherein the housing is constructed of a material to thermally match the common optical aperture.

12. An apparatus, comprising:
a housing having a plurality of ports, each of the plurality of ports to receive a fiber;
a plurality of GRIN lenses disposed within the housing, each of the plurality of GRIN lenses to receive a light beam from a corresponding port of the plurality of ports; and
a rhombic prism having a common optical aperture disposed on an outer surface area, the common optical aperture coupled to the plurality of GRIN lenses to receive the light beam from each of the plurality of GRIN lenses, the common optical aperture to simultaneously operate on the light beams received from each of the plurality of GRIN lenses and wherein the rhombic prism has an inner surface and the light beams have a P-polarized and a S-polarized component, and wherein the beamsplitter has a coating on the inner surface to separate the S-polarized and P-polarized components of the light beam into spatially separate beams.

13. A method, comprising:
collimating at least four light beams by a single device having a common optical aperture; and
spatially separating each of the at least four light beams using the single device, wherein spatially separating comprises:
reflecting a S-polarized component of each of the at least four light beams;
refracting a P-polarized component of each of the at least four light beams; and
propagating each S-polarized component of each of the at least four light beams towards a corresponding output port and propagating each P-polarized component of each of the at least four light beams to another corresponding output port.

14. The method of claim 13, further comprising focusing each of the S-polarized and P-polarized components into respective output fibers.

15. An apparatus, comprising:
means for receiving a at least four light beams by a single device having a common optical aperture; and
means for spatially separating each of the at least four light beams using the single device, wherein the means for receiving comprise means for collimating each of the at least four light beams to the common optical aperture, and wherein spatially separating comprises reflecting a S-polarized component of each of the at least four light beams and refracting a P-polarized component of each of the at least four light beams; and
means for reflecting each of the S-polarized component of each of the at least four light beams towards a corresponding output port and propagating the P-polarized component of each of the at least four light beams to another corresponding port.

16. The apparatus of claim 15, further comprising means for focusing each of the S-polarized and P-polarized components into respective output fibers.

* * * * *